(12) United States Patent  (10) Patent No.: US 7,427,859 B2
Fukuoka et al.  (45) Date of Patent: Sep. 23, 2008

(54) MOVING BODY DETECTING APPARATUS

(75) Inventors: Seiji Fukuoka, Tokyo (JP); Toshinao Kido, Tokyo (JP)

(73) Assignee: TDK Corporation, Tokyo (JP)

( * ) Notice: Subject to any disclaimer, the term of this patent is extended or adjusted under 35 U.S.C. 154(b) by 23 days.

(21) Appl. No.: 11/200,088

(22) Filed: Aug. 10, 2005

(65) Prior Publication Data

US 2007/0035293 A1  Feb. 15, 2007

(51) Int. Cl.
*G01B 7/30* (2006.01)
(52) U.S. Cl. .............................. 324/207.21; 324/207.25
(58) Field of Classification Search ............ 324/207.21, 324/207.25, 252
See application file for complete search history.

(56) References Cited

U.S. PATENT DOCUMENTS

| 5,789,919 | A  | * | 8/1998  | Umemoto et al. ...... 324/207.21 |
| 5,801,529 | A  |   | 9/1998  | Umemoto et al. |
| 6,154,025 | A  | * | 11/2000 | Schelter et al. ........ 324/207.21 |
| 6,175,296 | B1 | * | 1/2001  | Tokunaga et al. ......... 338/32 R |
| 6,255,811 | B1 | * | 7/2001  | Hatazawa et al. ...... 324/207.21 |
| 2002/0168130 | A1 | * | 11/2002 | Chaparala ..................... 385/16 |
| 2004/0130314 | A1 | * | 7/2004  | Bossoli et al. .............. 324/174 |

FOREIGN PATENT DOCUMENTS

| JP | 9-329461 | 12/1997 |
| JP | 9-329462 | 12/1997 |
| JP | 2001165947 | * 6/2001 |

\* cited by examiner

*Primary Examiner*—Patrick Assouad
*Assistant Examiner*—David M. Schindler
(74) *Attorney, Agent, or Firm*—Oblon, Spivak, McClelland, Maier & Neustadt, P.C.

(57) ABSTRACT

A moving body detecting apparatus including at least a gear 1 as a magnetic moving body including at least one of a projected portion or a recessed portion, a bias magnet 5 for applying a bias magnetic field thereto, and two pairs of spin valve type giant magneto resistive elements R1, R2 and R3, R4, in which the moving body detecting apparatus is arranged such that magnetizing directions of pinned layers of the paired spin valve type giant magneto resistive elements are directed to direct substantially in a forward direction and substantially in an opposite direction relative to the direction of moving the gear 1, for example, linearly. In a first state in which a change in a magnetic field by the projected portion 2 of the gear 1 is not substantially received, the magnetic field at positions of the elements R1 through R4 includes a component forwardly in parallel or in anti-parallel with the magnetizing directions of the pinned layers of the elements R1 through R4, and in a second state of receiving the change in the magnetic field by the projected portion 2, a direction of a component of the magnetic field at the positions of the elements R1 through R4 in parallel with the magnetizing directions of the pinned layers is inversed.

9 Claims, 16 Drawing Sheets

WHEN L>P/2

WHEN L>P/2

FIG. 4A
BACKGROUND ART
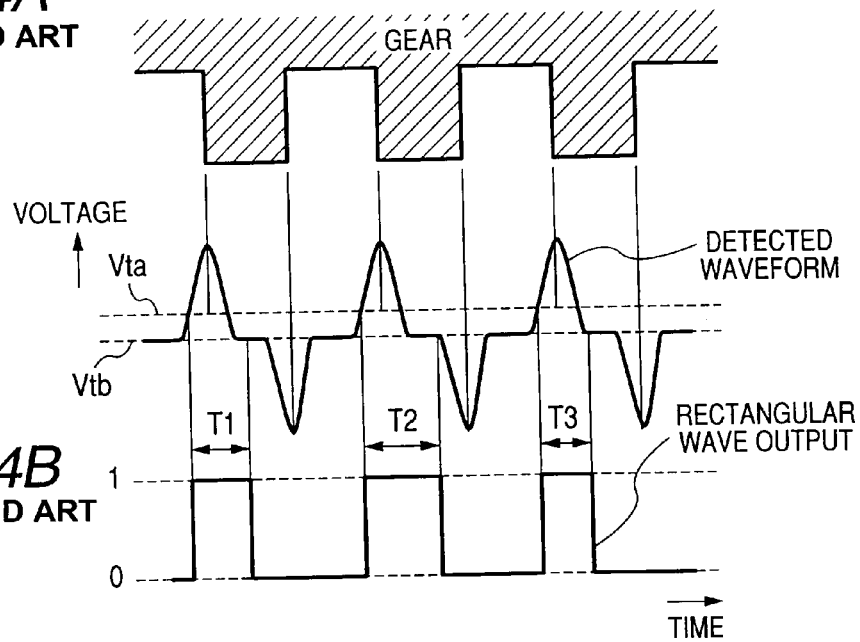
FIG. 4B
BACKGROUND ART
FIG. 5
BACKGROUND ART
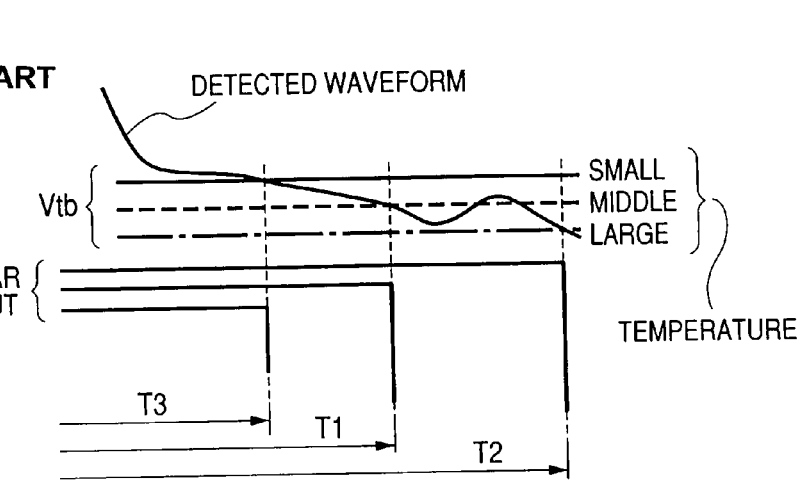

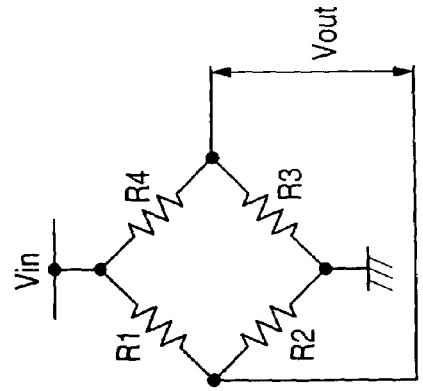
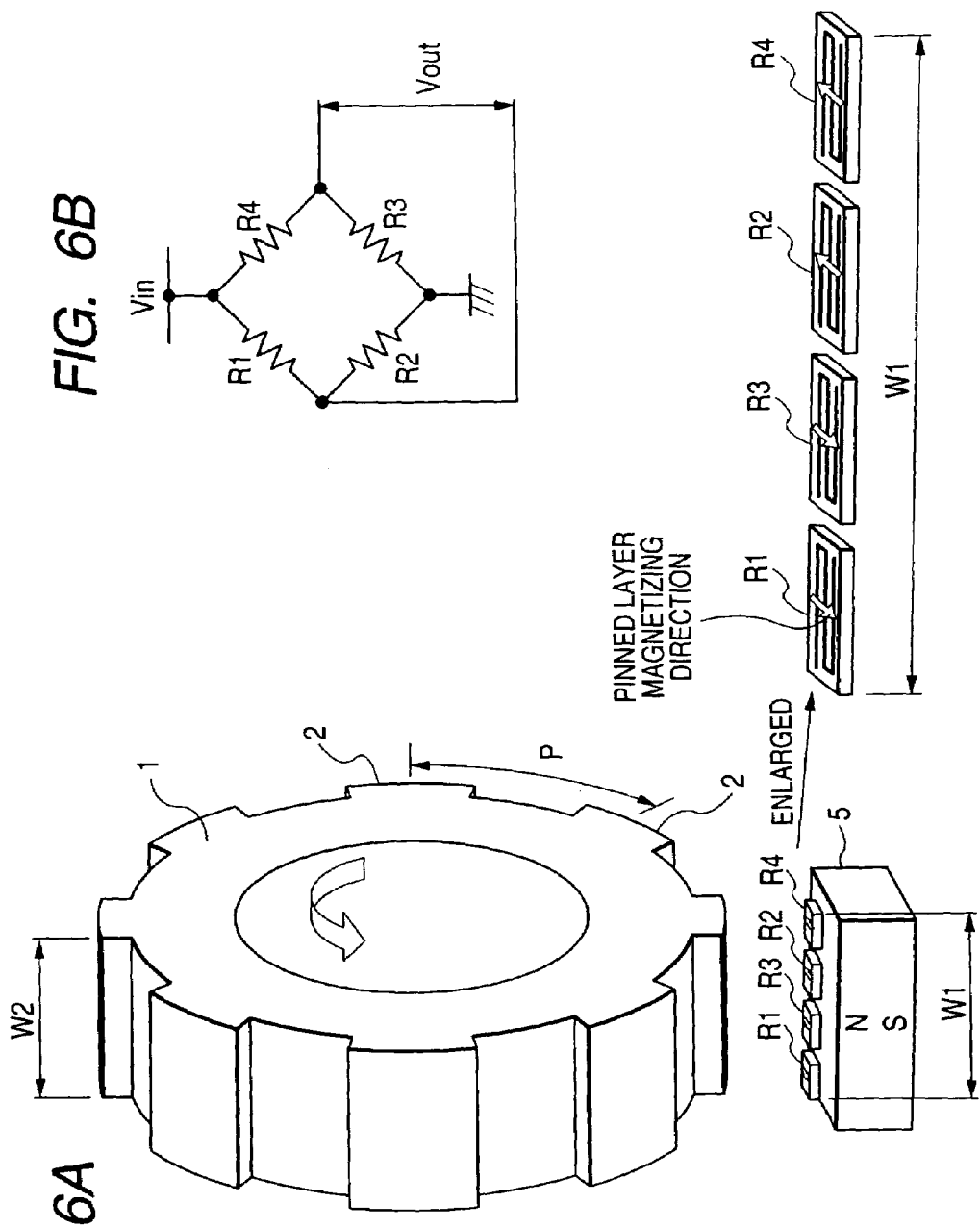
FIG. 6B
FIG. 6A

MOVING BODY DETECTING APPARATUS

BACKGROUND OF THE INVENTION

The present invention relates to a moving body detecting apparatus for detecting a change in a magnetic field in accordance with movement of a magnetic moving body, particularly relates to a moving body detecting apparatus which is preferable by being used in a case of detecting information of rotating a soft magnetic gear used in an industrial machining tool, an engine of an automobile or the like.

In a related art, there is known a moving body detecting apparatus used for a rotation sensor or the like using an intensity detecting type giant magneto resistive element (hereinafter, intensity detecting type GMR element).

There is known a rotation sensor for detecting rotation of a magnetic moving body (magnetically detected body) of a soft magnetic gear or the like which is arranged with magneto sensitive elements opposed to a magnetic moving body separately at two regions. An interval of arranging the magneto sensitive elements constitute an interval adapted to a projection-to-projection pitch of the magnetic moving body (with respect to a projection-to-projection pitch=P of a gear, a magneto sensitive element aligning interval L=P/2 is regarded to be optimum). Further, when the magnetic moving body is rotated, a signal in correspondence with the recess and projections is outputted.

Particularly, when a magneto resistive element is used as a magneto sensitive element, there is proposed a constitution of including 2 pieces of magneto resistive elements at each of the above-described two regions and a total of 4 pieces of the magneto resistive elements are integrated to a Wheatstone bridge circuit in JP-A-9-329462.

According to the patent reference, when there is a projected portion of a gear at one of the magneto sensitive regions, a recessed portion of the gear is disposed at other of the magneto sensitive regions and therefore, outputs of the magneto resistive elements are inversely polarized. An output of 4 times as much as that of one element is provided by outputting a difference thereof by integrating the magneto resistive elements to the Wheatstone bridge circuit.

Meanwhile, the magneto resistive element used in the rotation sensor of the related art is of a magnetic field intensity sensing type and is provided with a property that a resistance value thereof becomes maximum when an external magnetic field is 0 and when the external magnetic field is increased, the resistance value is reduced. FIG. 1A schematically shows an arrangement of a magneto sensitive element, a bias magnet and a soft magnetic gear in a case of a related art in which the magnetosenstive elements of the magnetic field intensity sensing type are arranged separately at two regions, an interval of arranging magneto sensitive regions is designated by notation L and a projection-to-projection pitch of the gear is designated by notation P. 2 pieces of the magneto resistive elements 'are arranged at each of the magneto sensitive element regions.

FIG. 1B; FIG. 1C show signal outputs and a differential output from respective elements (detected outputs when a Wheatstone bridge circuit is integrated by a total of 4 pieces of magneto sensitive elements) when the elements are optimally arranged in the related art, signal output phases of the elements of the two regions are shifted from each other by 180° as shown by FIG. 1B and therefore, the differential output of FIG. 1C becomes a maximum.

FIG. 1D, FIG. 1E are for explaining a problem of the related art (when deviated from the optimum element arrangement), showing signal outputs and a differential output from the respective elements when L>P/2, the shift of the signal output phases of the elements of the two regions is reduced as shown by FIG. 1D and therefore, the differential output of FIG. 1E is reduced.

As has been explained in reference to FIGS. 1A through 1E, the magneto sensitive elements used in the rotation sensor of the related art is of the magnetic field intensity sensing type and therefore, there poses a problem that it is necessary to align the two region at an interval L=P/2 relative to the projection-to-projection pitch (=P) of the gear in order to provide the optimum change in the output and when the projection-to-projection pitch (=P) of the gear and the interval L between the two regions are brought into a relationship of L>P/2, a shift of phases of output signals of two regions is reduced and an optimum differential signal output from the Wheatstone bridge circuit is not provided (an amplitude of the differential output is reduced).

Further, there is proposed other moving body detecting apparatus in JP-A-9-329461. According to the detecting apparatus, in a constitution of arranging intensity detecting type GMR elements between a gear as a magnetic moving body and a magnet, even in a case of an intensity detecting type GMR element having a hysteresis, it is determined that a range of changing a resistance value becomes symmetric by shifting to arrange a center of a magneto sensitive face and a center of the magnet to thereby provide a waveform in correspondence with edges of recessses and projections of the gear. A waveform at that occasion is shown in FIG. 2A. FIG. 2A shows a detected waveform of the intensity detecting type GMR element in correspondence with a projected portion of the gear as the magnetic moving body, and notations Vta, Vtb designate threshold voltages when the detected waveform of the intensity detecting type GMR is shaped. FIG. 2B shows a rectangular waveform output after shaping the waveform.

FIG. 3 shows a magnetic property of the intensity detecting type GMR element having a hysteresis characteristic. According to the apparatus of JP-A-9-329461, when the Wheatstone bridge circuit is integrated by using two pairs of intensity detecting type GMR elements, a detected waveform in a positive direction and a detected waveform in a negative direction are set to provide peaks of the same degree such that one of the paired intensity detecting type GMR elements constitutes an operating point on a right side of a curve and other thereof constitutes an operating point on a left side of the curve to constitute the operating points symmetric with each other.

Meanwhile, the GMR element used in the above-described detecting apparatus is of the magnetic field intensity sensing type (multilayer film type) and is provided with the hysteresis as shown by the characteristic diagram of FIG. 3. A detecting signal sampled from the Wheatstone bridge circuit is constituted by a waveform having peaks on upper and lower sides as shown by FIG. 2A. Notation Vta of FIG. 2A designates a rise threshold voltage and notation Vtb designates a fall threshold voltage. It is devised that by providing a width in the threshold voltage in this way, even when the detected waveform is more or less moved in an up and down direction by a temperature drift, the detected waveform traverses the threshold voltage. Meanwhile, in a relationship between a detected waveform of the intensity detecting type GMR element in correspondence with a projected portion of a gear of FIG. 4A and a rectangular wave output after shaping the waveform of FIG. 4B, when the detected waveform or the threshold voltage Vta, Vtb is further shifted by the temperature drift, there poses a problem that as shown by a diagram of enlarging a vicinity of the detected waveform threshold of FIG. 5 (in temperature drift), the threshold voltage comes to the hem portion of the detected waveform (in temperature drift), pulse widths T1, T2, T3 of a rectangular waveform of FIG. 4B are provided with different values, that is, rectangular waves which differ by respective projected portions of the gear are outputted.

SUMMARY OF THE INVENTION

In view of the above-described, it is a first object of the invention to provide a moving body detecting apparatus in which a detected output is not dependent on a recess and projection pitch of a magnetic moving body by using at least a pair of spin valve type giant magneto resistive elements of a magnetic field vector detecting type as magneto sensitive elements and arranging the moving body detecting apparatus such that magnetizing directions of pinned layers of the paired spin valve type giant magneto resistive elements are directed substantially in a forward direction and substantially in an opposite direction relative to a direction of moving a magnetic moving body.

Further, it is a second object of the invention to provide a moving body detecting apparatus capable of detecting a change in a magnetic field by moving a magnetic moving body by utilizing a steep change in a resistance of a spin valve type giant magneto resistive element (hereinafter, SV-GMR element) and capable of providing a detecting signal strong at (not influenced by) a variation in a detected waveform by a temperature drift of a circuit element for providing the detected signal of the SV-GMR element, axis deflection of a gear as the magnetic moving body or other disturbance noise or the like by using the SV-GMR operated by a component of a magnetic field in parallel and in anti-parallel with a magnetizing direction of a pinned layer as a magneto sensitive element and moving a bias point to an upper limit or a lower limit saturated region of a magnetic property of the SV-GMR element when a bias magnetic field is applied thereto by a bias magnet.

In order to achieve the first object, a moving body detecting apparatus includes a magnetic moving body having at least a projected portion or a recessed portion, magnetic field generating means for generating a magnetic field, and at least a pair of spin valve type giant magneto resistive elements between the magnetic moving body and the magnetic field generating means; wherein the moving body detecting apparatus is arranged such that magnetizing directions of pinned layers of the paired spin valve type giant magneto resistive elements are directed substantially in a forward direction and substantially in an opposite direction relative to a direction of moving the magnetic moving body.

Further, the paired spin valve type giant magneto resistive elements include double meander patterns as a magnetoresistance pattern.

Further, the paired spin valve type giant magneto resistive elements include double miander patterns as a magnetoresistance pattern.

Further, the paired spin valve type giant magneto resistive elements are overlapped to align between the magnetic moving body and the magnetic field generating means.

According to the moving body detecting apparatus of the invention, by using the spin valve type giant magneto resistive element SV-GMR as a magneto sensitive element, using the bias magnet for applying a bias magnetic field thereto and arranging the moving body detecting apparatus such that the magnetizing directions of the pinned layers of the paired SV-GMR elements are directed substantially in the forward direction and substantially in the opposite direction relative to the direction of moving the magnetic moving body, a detected output can be prevented from being dependent on the recess and projection pitch of the magnetic moving body.

Further, since the SV-GMR element is not a magnetic field intensity depending type magneto sensitive element, the detected output can be prevented from being dependent on a change in a gap between the magnetic moving body and the SV-GMR element.

Therefrom, a degree of freedom of design of a counter side apparatus for attaching the moving body detecting apparatus becomes high, a strict control of positions of attaching the SV-GMR element-and the bias magnet is not needed and a variation in the detected output voltage for each product can be reduced.

Moreover, in order to achieve the above-described second object, a moving body detecting apparatus includes a magnetic moving body having at least one projected portion or recessed portion, magnetic field generating means for generating a magnetic field, and a spin valve type giant magneto resistive element between the magnetic moving body and the magnet field generating means; wherein in a first state in which a change in the magnetic field by the projected portion of the recessed portion of the magnetic moving body is not substantially received, the magnetic field at a position of the spin valve type giant magneto resistive element includes a component in parallel or in anti-parallel with a magnetizing direction of a pinned layer of the spin valve type giant magneto resistive element; and wherein in a second state of receiving a change in the magnetic field by the projected portion or the recessed portion, a direction of a component of the magnetic field at the position of the spin valve type giant magneto resistive element is inversed.

Further, a center of the SV-GMR element is shifted in a direction of moving the magnetic moving body relative to a center of the bias magnet.

Further, a magnetic pole face is inclined such that a magneto sensitive face of the SV-GMR element and the magnetic pole face of the magnetic field generating means are not in parallel with each other.

Further, a yoke is partially arranged at a position shifted from a center of a magnetic pole face of the magnetic field generating means in a direction of moving the magnetic moving body.

Further, the magnetic moving body is a rotating member including a projected portion or a recessed portion, the SV-GMR element is arranged between an outer periphery of the rotating member and the magnetic field generating means, and a rotational center of the rotating member is disposed at a position shifted from a linear line passing a center of the magnetic field generating means and a center of the SV-GMR element.

Further, in that at least a pair of the SV-GMR elements are provided and magnetizing directions of pinned layers of the paired spin valve type giant magetoresistance elements are directed to oppose to each other.

According to the moving body detecting apparatus of the invention, in the case of using the magnetic moving body having at least one of the projected portion or the recessed portion, the bias magnet for generating the magnetic field and the SV-GMR element the resistance value of which is changed in correspondence with the magnetic field changed by the magnetic moving body, in the first state in which a change in the magnetic field by the projected portion or the recessed portion of the magnetic moving body is not substantially received, the magnetic field at a position of the SV-GMR element includes a component in parallel or in anti-parallel with the magnetizing direction of the pinned layer of the SV-GMR element and in the second state of receiving the change in the magnetic field by the projected portion or the recessed portion, a direction of a component of the magnetic field at the position of the SV-GA element is inversed and therefore, a variation in the detected waveform caused by a temperature drift of the SV-GMR element, axis deflection of the gear as the magnetic moving body, or other disturbance noise can be reduced and a highly reliable detected signal can be provided.

BRIEF DESCRIPTION OF THE DRAWINGS

FIG. 4A is a detected waveform diagram by a change in a resistance of the intensity detecting type GMR element in correspondence with a projected portion of a soft magnetic gear in an apparatus of a related art in a temperature drift.

FIG. 4B is a rectangular wave output waveform diagram shaping a detected waveform by a rise threshold voltage Vta, a fall threshold voltage Vtb.

FIG. 5 is a diagram enlarging a vicinity of a detected waveform threshold in a temperature drift.

FIG. 6A is a schematic perspective view showing a constitution of a moving body detecting apparatus of Embodiment 1 of a moving body detecting apparatus according to the invention.

FIG. 6B is a circuit diagram of the constitution of FIG. 6A.

FIG. 11A shows a differential output in a case of an arrangement of an element of a related art and FIG. 11B shows a differential output in using an SV-GMR element, respectively.

DETAILED DESCRIPTION OF THE PREFERRED EMBODIMENTS

An embodiment of a moving body detecting apparatus will be explained as the best mode for carrying out the invention in reference to the drawings as follows.

FIGS. 6A and 6B show Embodiment 1 of a moving body detecting apparatus according to the invention in a case of constituting a rotation sensor for detecting rotation of a soft magnetic gear as a magnetic moving body.

In FIG. 6A, numeral 1 designates a soft magnetic gear having recesses and projections (for example, having projected portions 2 at a constant aligning pitch P) at an outer peripheral face thereof Further, 4 pieces of SV-GMR elements R1, R2, R3, R4 are fixedly arranged to be opposed to the outer peripheral face of the soft magnetic gear 1 and a bias magnet 5 for applying a bias magnetic field is fixedly arranged rearward therefrom. In this case, 4 pieces of SV-GMR elements R1, R2, R3, R4 are arranged in a direction substantially orthogonal to a moving direction (rotational direction) of the soft magnetic gear I and linearly in a thickness direction of the gear 1.

Figure 7:
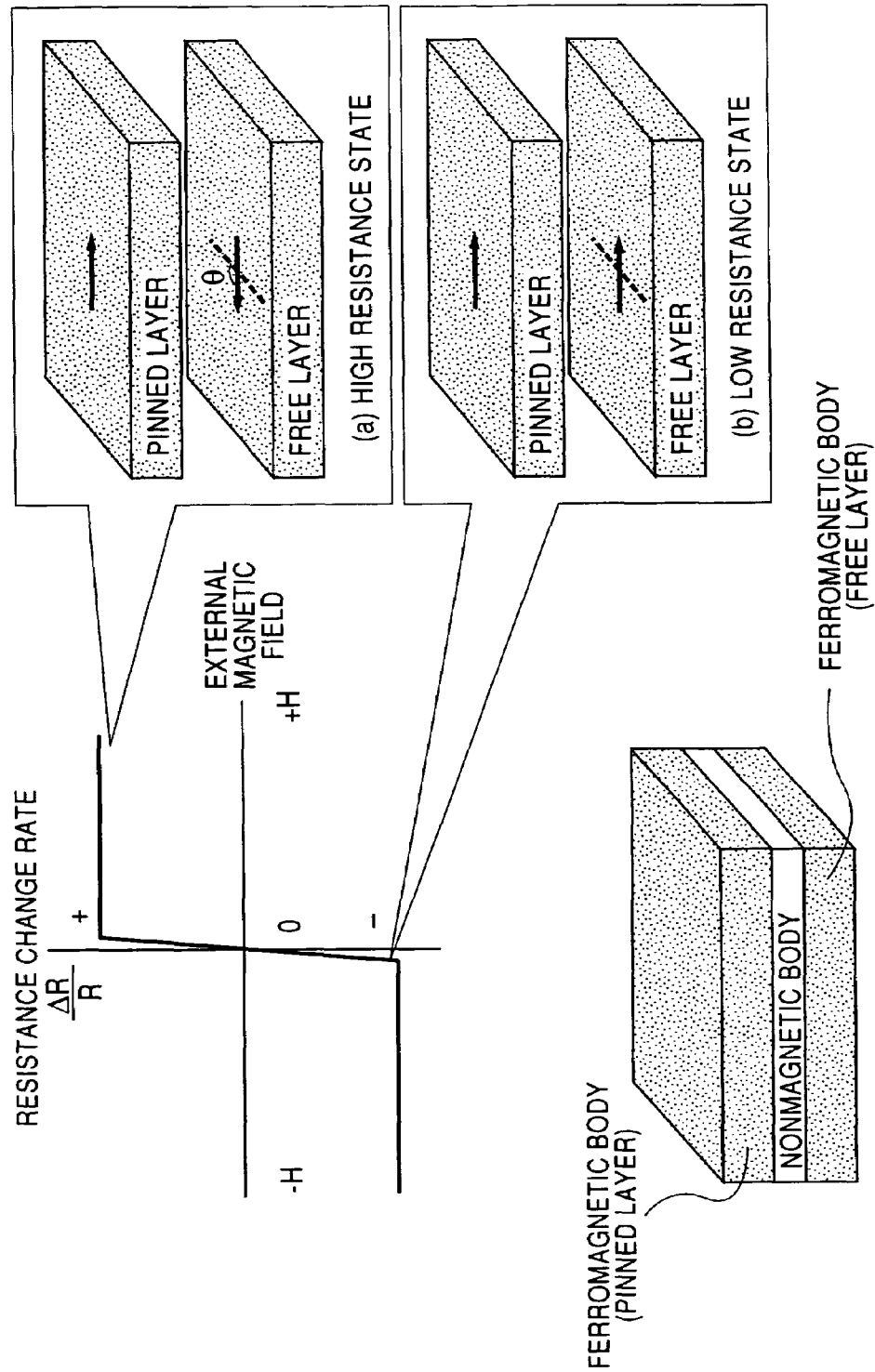
FIG. 7 is an explanatory view showing a film constitution and a magnetic property of an SV-GMR element used in an embodiment of the invention.

According to the embodiment, the SV-GMR element is used as a GMR element a resistance value of which is changed in correspondence with a magnetic field changed by the soft magnetic gear 1 constituting the magnetic moving body and FIG. 7 shows a schematic film constitution and a magnetic property thereof The SV-GMR element includes a pinned layer of a ferromagnetic material a magnetizing direction of which is fixed in one direction, and a free layer of a ferromagnetic material laminated on the pinned layer via a nonmagnetic material in which a current mainly flows, the magnetizing direction of the pinned layer is not changed by an external magnetic field (external magnetic flux) and the free layer is magnetized in a direction of the external magnetic field (external magnetic flux). In this case, when the magnetizing direction of the pinned layer and the magnetizing direction of the free layer (that is, the direction of the external magnetic field) are orthogonal to each other (when θ=0 in FIG. 7), a resistance change rate (ΔR/R) is 0. When although the magnetizing direction of the pinned layer and the magnetizing. direction of the free layer (that is, the direction of the external magnetic field H) are in parallel with each other and the direction thereof are opposite to each other, that is, the magnetizing directions are in anti-parallel with each other, the resistance change rate becomes positive to bring about a high resistance state (a) as shown in FIG. 7. Further, when the magnetizing direction of the pinned layer and the magnetizing direction of the free layer (that is, the direction of the external magnetic field H) are in parallel with each other and the direction thereof-are the same, that is, the magnetizing directions are in parallel with each other, the resistance change rate becomes negative to bring about a low resistance state (b) in FIG. 7.

Each of 4 pieces of SV-GMR elements R1, R2, R3, R4 having the magnetic property as shown by FIG. 7 is provided with a magneto sensitive face having a single meander pattern as a magneto resistance pattern constituting a magneto sensitive pattern, it is preferable that the magneto sensitive faces are disposed in the same plane in parallel with a plane brought into contact with the outer peripheral face of the soft magnetic gear 1, the magnetizing direction of the pinned layer of R1 in the paired SV-GMR elements R1, R2 is substantially in the opposite direction of the direction of rotating the gear and the magnetizing direction of the pinned layer of R2 thereof is substantially in a forward direction thereof. Similarly, the magnetizing direction of the pinned layer of R3 of another set of the paired SV-GMR elements R3, R4 is substantially in the opposite direction of the direction of rotating the gear and the magnetizing direction of the pinned layer of R4 thereof is substantially in the forward direction.

The bias magnet of FIG. 6A is a permanent magnet having, for example, an N pole at a face thereof opposed to the outer peripheral face of the soft magnetic gear 1 and an S pole at a face thereof opposed thereto to establish a relationship in which 4 pieces of SV-GMR elements R1, R2, R3, R4 are disposed between the N pole face and the soft magnetic gear 1. It is preferable that the permanent magnet is provided with lateral width sufficiently larger than a width W1 of arranging 4 pieces of SV-GMR elements such that substantially a uniform magnetic field can be applied to the respective SV-GMR elements R1, R2, R3, R4 aligned linearly. Similarly, it is preferable that also a thickness W1 is equal to or larger than W1.

As shown by FIG. 6B, a Wheatstone bridge circuit is constituted by the pair of SV-GMR elements R1, R2 and other pair of SV-GMR elements R3, R4, and the Wheatstone bridge circuit is supplied with a constant supply voltage Vin. A detected output Vout is provided as a potential difference between a connection point of R1, R2 and a connection point of R3, R4.

Figure 8A:
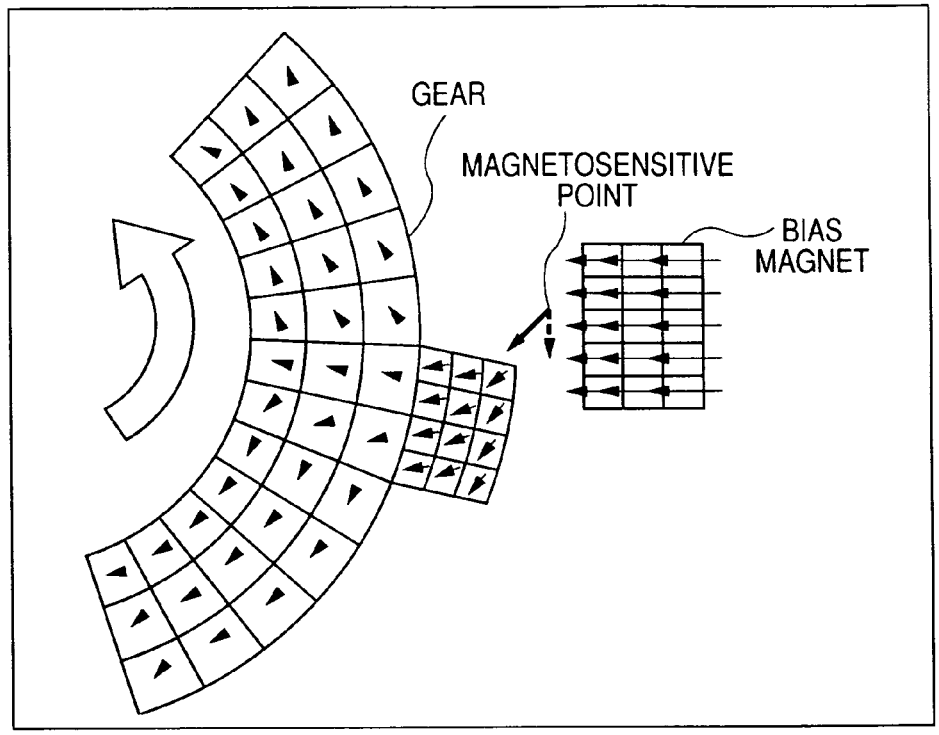
FIG. 8A is an explanatory view of a relationship between a position of a projected portion of a soft magnetic gear and a direction of a magnetic flux at a magneto sensitive point in approaching the projected portion in Embodiment 1.
Figure 8B:
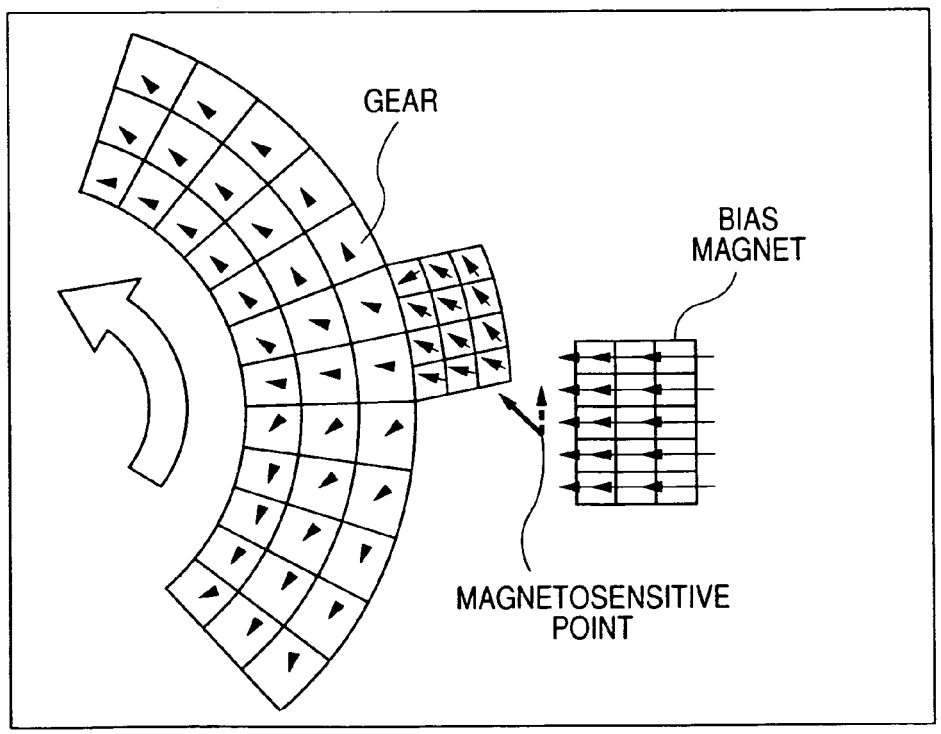
FIG. 8B is an explanatory view showing a relationship between the position of the projected portion of the soft magnetic gear and a direction of the magnetic flux at the magneto sensitive point in separating from the projected portion in Embodiment 1.

FIG. 8A shows a direction of an external magnetic field (direction of magnetic flux) when the projected portion 2 of the gear 1 approaches a magneto sensitive point frontward from the bias magnet 5 (may be regarded as a region of arranging SV-GMR elements R1 through R4), and FIG. 8B shows a direction of the external magnetic field (direction of magnetic flux) when the projected portion 2 of the gear 1 is separated from the magneto sensitive point.

Therefore, when the projected portion 2 of the soft magnetic gear 1 constituting an object to be detected approaches magneto sensitive faces of SV-GMR elements R1, R2, R3, F4, a component of a magnetic flux vector of each SV-GMR element at a position of the magneto sensitive face in a tangential direction of rotating the gear is directed in a direction in which the projected portion 2 approaches. As shown by FIG. 7, according to the magnetic property of the SV-GMR element, the resistance change rate (ΔR/R) is negative when the direction of the external magnetic field and the pinned layer magnetizing direction are forwardly in parallel, the resistance change rate (ΔR/R) is positive when the direction of the external magnetic field and the pinned layer magnetizing direction are in anti-parallel and therefore, when the magnetic flux vector component is directed in the direction in which the projected portion approaches, at ones of SV-GMR elements R1, R3 of two pairs of SV-GMR elements (pair of R1 and R2 and pair of R3 and R4), the resistance value is reduced (when the pinned layer magnetizing direction and the component of the magnetic flux vector direction in the tangential direction of the gear are forwardly in parallel) and at others of SV-GMR elements R2, R4, the resistance value is increased (when the pinned layer magnetizing direction and the component of the magnetic flux vector direction in the tangential direction of the gear are in anti-parallel).

Further, when the projected portion 2 is separated from the magneto sensitive faces of SV-GMR elements R1, R2, R3, F4, the component of the magnetic flux vector in the tangential direction of rotating the gear at the position of the magenetosensitive face of the SV-GMR element is directed in a direction in which the projected portion 2 is separated therefrom. When the magnetic flux vector component is directed in the direction in which the projected portion is separated therefrom, at ones of SV-GMR elements R1, R3, the resistance value is increased (when the pinned layer magnetizing direction and the component of the magnetic flux vector direction in the tangential direction of the gear are in anti-parallel) and at others of the SV-GMR elements R2, R4, the resistance value is reduced (when the pinned layer magnetizing direction and the component of the magnetic flux vector direction in the tangential direction of the gear are forwardly in parallel).

In this way, when the projected portion 2 of the soft magnetic gear 1 approaches or separates, at respective pairs of two pairs of SV-GMR elements, a resistance value of one of the pairs becomes a minimum, other thereof becomes a maximum, and by integrating the Wheatstone bridge circuit of FIG. 6B, the detected output Vout 4 times as much as that of a single SV-GMR element can be provided. The detected output Vout is changed from a high level to a low level at each time of passing the projected portion 2 of the soft magnetic gear I and therefore, rotation of the soft magnetic gear 1 can be detected.

Further, according to the SV-GMR element, as is known from the magnetic property of FIG. 7, when the external magnetic field is equal to or larger than a predetermined value, the resistance change rate becomes a positive constant value or a negative constant value and therefore, although the resistance change rate is dependent on the direction of the external magnetic field, the resistance change rated is not dependent on the intensity of the external magnetic field. Therefore, even when a gap between the projected portion of the gear and the magneto sensitive face of GMR element is changed, a detected output voltage from the Wheatstone bridge of FIG. 6B is not changed.

Figure 1A:
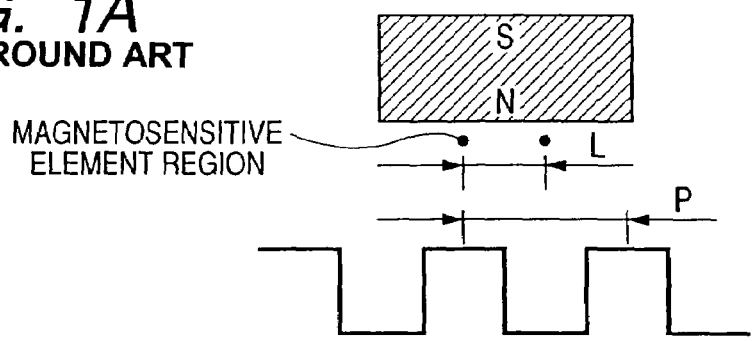
FIG. 1A is an explanatory view of an arrangement of an element of a related art.
Figure 1B:
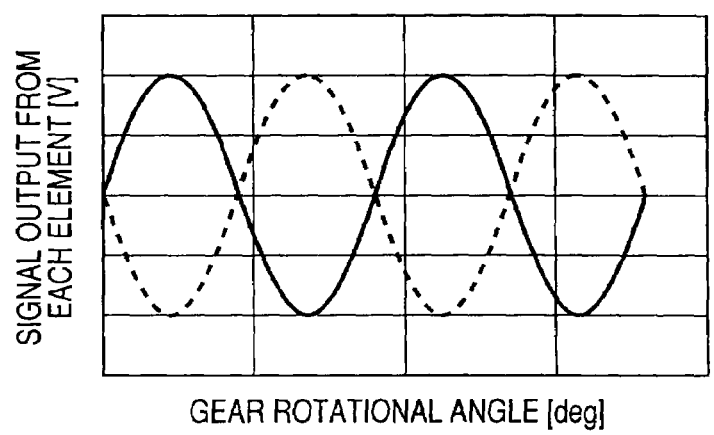
FIG. 1B is a signal output waveform diagram from each element in a case of an optimum arrangement of an element of a related art.
Figure 1C:
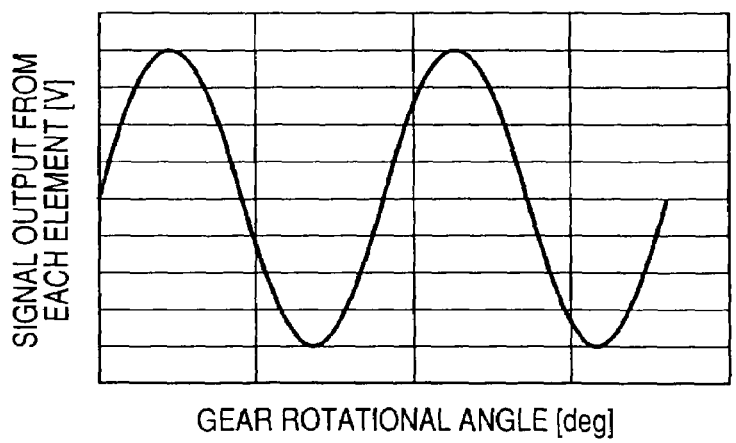
FIG. 1C is a differential output waveform diagram of each element in the case of the optimum arrangement of the element of the related art.
Figure 1D:
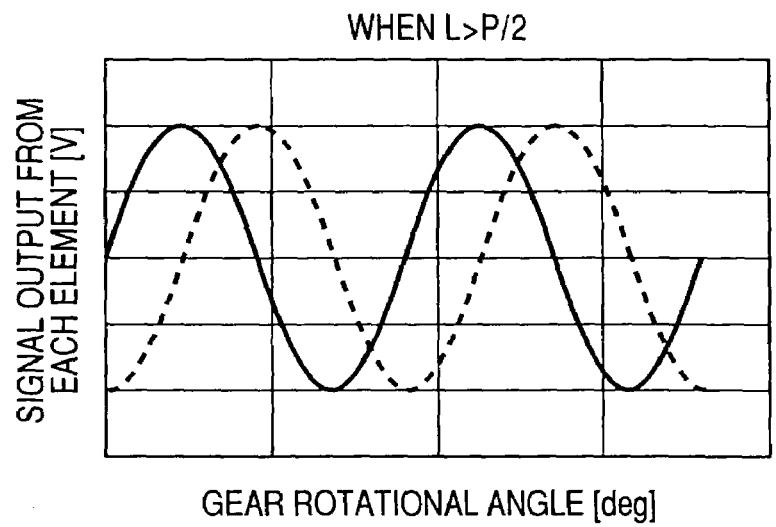
FIG. 1D is a signal output waveform diagram from each element in a case of explaining a problem of the related art.
Figure 1E:
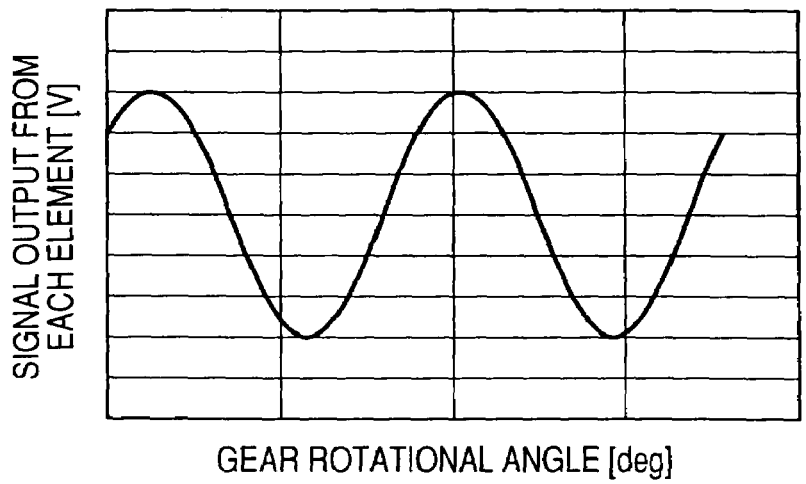
FIG. 1E is a differential output waveform diagram of each element in the case of explaining the problem of the related art.
Figure 2A:
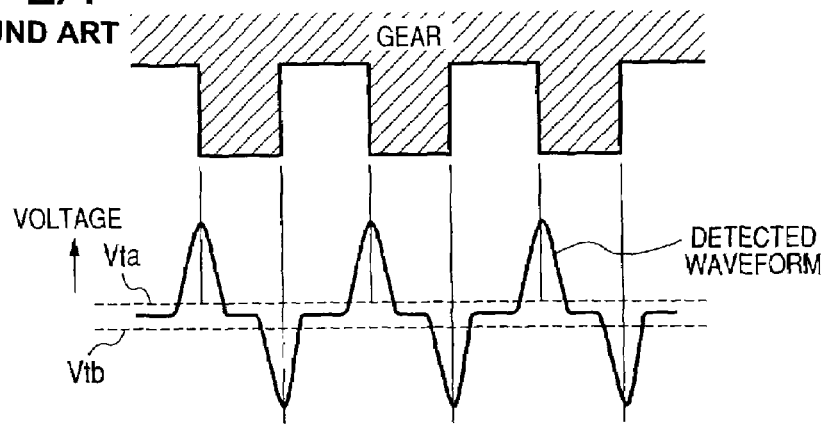
FIG. 2A is a detected waveform diagram by a change in a resistance of an intensity detecting type GMR element in correspondence with a projected portion of a soft magnetic gear in a moving body detecting apparatus using the intensity detecting type GMR element of a related art.
Figure 2B:
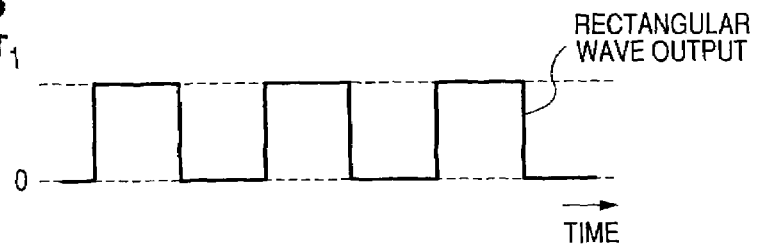
FIG. 2B is a rectangular wave output waveform diagram shaping a detected waveform by a rise threshold voltage Vta, a fall threshold voltage Vtb.
Figure 3:
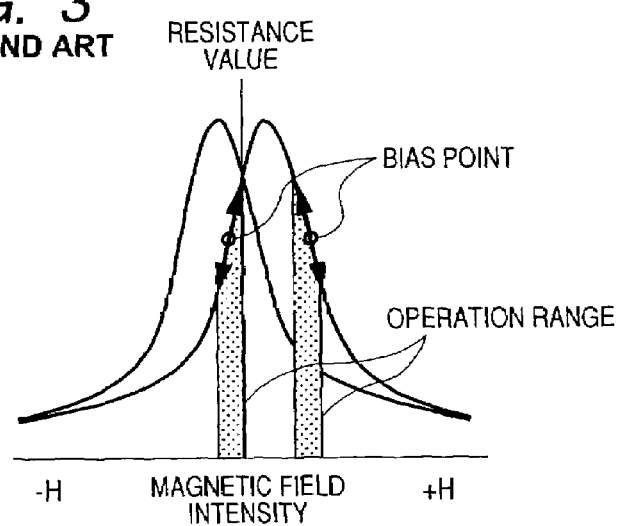
FIG. 3 is an explanatory view showing a magnetic property and a bias point of an intensity detecting type GMR element.
Figure 11A:
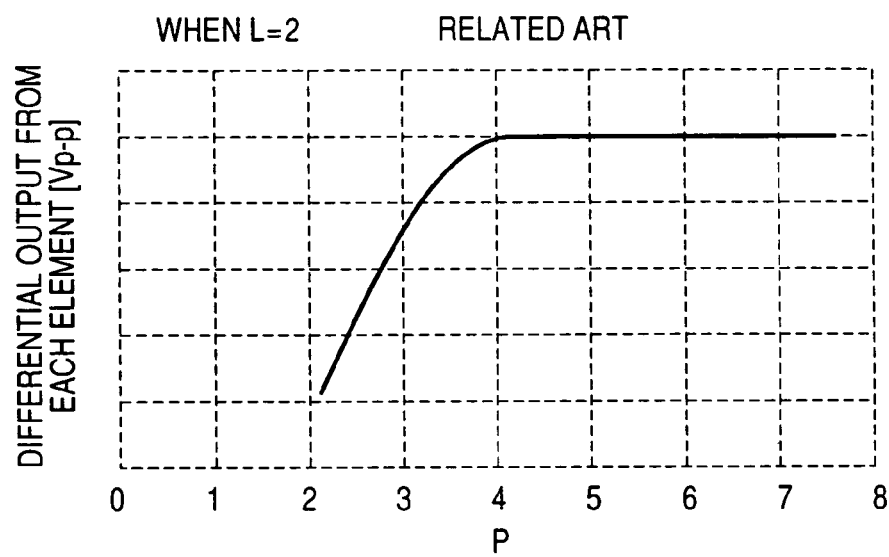
FIG. 11A and FIG. 11B are graphs of a relationship between a projection-to-projection pitch P of a soft magnetic gear and a differential output (detected output voltage from a Wheatstone bridge)
Figure 11B:
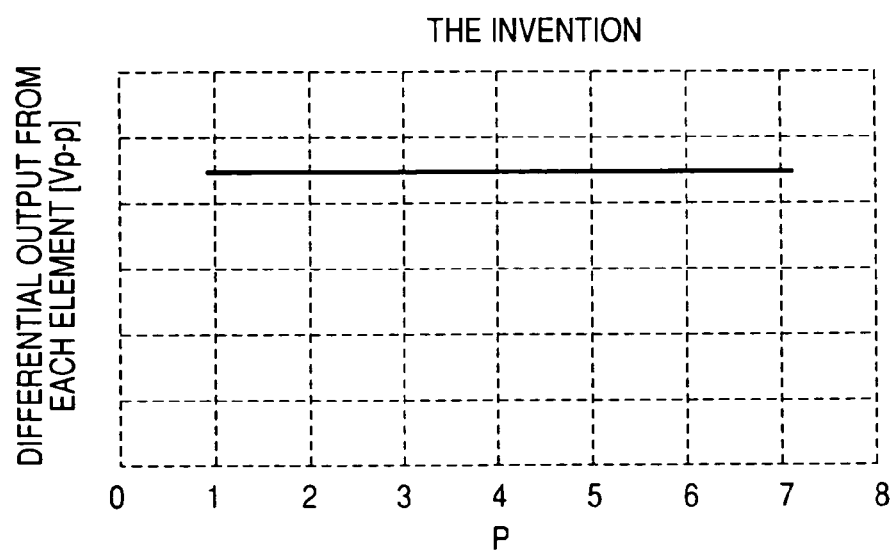

Further, although in the case of the constitution of the related art of FIG. 1A, when a relationship between the interval L of arranging the magneto sensitive element region and the projection-to-projection pitch P of the gear is inappropriate (in a range of 2L>P) as shown by FIG. 11A, the differential output is reduced, in the case of the embodiment, even when the projection-to-projection pitch P of the gear is changed, the detected output voltage (peak value) remains unchanged as shown by FIG. 11B.

According to Embodiment 1, the following effect can be achieved.

(1) Although in the case of the rotation sensor of the related art in which the magneto sensitive elements of the magnetic field intensity depending type are arranged at two regions, when the pitch of aligning a plurality of magneto sensitive elements is not appropriate relative to the pitch of the projected portion of the soft magnetic gear, the detected output voltage is reduced (FIG. 11A), according to the embodiment, two pairs of SV-GMR elements (pair of R1, R2, and pair of R3, R4) are arranged in the single region in view from the direction of rotating the gear 1 (arranged in the thickness direction substantially orthogonal to the gear rotating direction), the pinned layer magnetizing directions of the paired SV-GMR elements are set to direct substantially in the forward direction and substantially in the opposite direction relative to the direction of rotating the gear and therefore, the detected output voltage (peak value) of the Wheatstone bridge integrated with the two pairs of SV-GMR elements is not influenced by the gear projection-to-projection pitch P (FIG. 11B).

(2) Although in the case of rotation sensor of the related art using the magneto sensitive element of the magnetic field intensity depending type, when the gap between the soft magnetic gear and the magneto sensitive face of the magneto sensitive element is increased, also the change amount of the recess values is reduced and also the detected output voltage from the Wheatstone bridge is reduced, according to the embodiment, by constituting the Wheatstone bridge by integrating two pairs of the SV-GMR elements of the magnetic field vector detecting type, the detected output voltage is not dependent on he gap.

(3) By the effects of (1), (2), a degree of freedom of design on a side of an-apparatus of attaching the rotation sensor becomes high, it is not necessary to finely adjust positions of the SV-GMR elements R1 through R4 and the bias magnet 5 in integration (it is not necessary to strictly control the attaching positions) and also a variation in the detected output voltage of respective products can be reduced.

(4) By outputting the detected output of rotation by constituting the Wheatstone bridge by using 4 pieces (2 pairs) of SV-GMR elements R1 through R4, the output voltage 4 times as much as that of a single piece of SV-GMR element can be provided and a detection sensitivity can be promoted.

Figure 9:
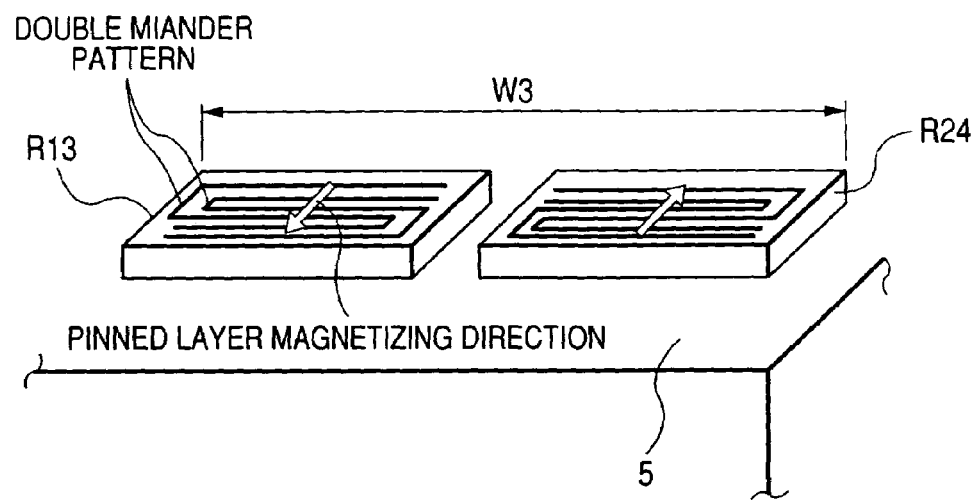
FIG. 9 is a schematic perspective view of Embodiment 2 of the invention.

FIG. 9 shows Embodiment 2 of the invention using 2 pieces of SV-GMR elements R13 and R24 each having a double meander pattern (two meander patterns) at a magneto sensitive face thereof as a magneto resistance pattern constituting a magneto sensitive pattern instead of using 4 pieces (2 pairs) of SV-GMR elements. The SV-GMR element R13 is constituted by forming R1, R3 having the same pinned layer magnetizing direction by one element and the SV-GMR element R24 is constituted by forming R2, R4 having the same pinned layer magnetizing direction by one element. Constitutions of arranging the SV-GMR elements and arranging the bias magnet 5 relative to the soft magnetic gear is similar to that of Embodiment 1.

In the case of Embodiment 2, the Wheatstone bridge can be constituted by integrating 2 pieces of SV-GMR elements each having the double meander pattern at the magneto sensitive face and further small-sized formation can be achieved. Further, a length W3 of linearly arranging 2 pieces of SV-GMR elements can be shortened and therefore, also the thickness of the gear can be reduced.

Figure 10:
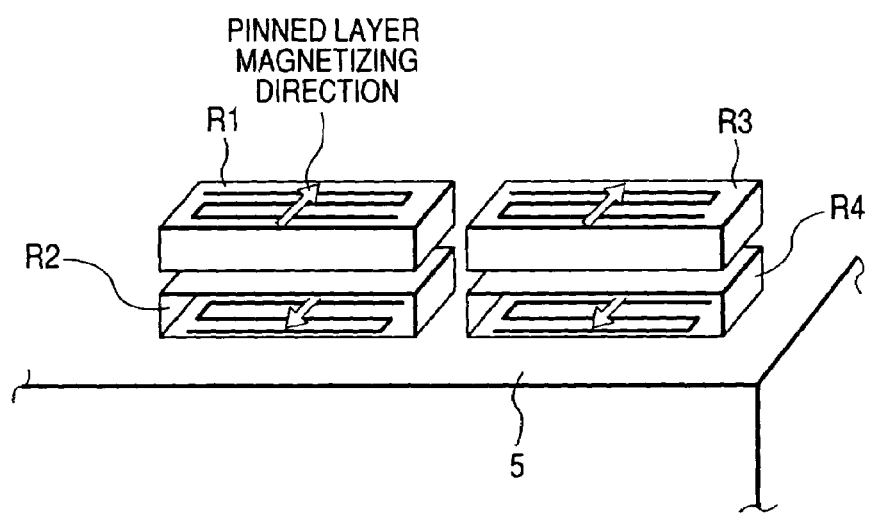
FIG. 10 is a schematic perspective view of Embodiment 3 of the invention.

Although according to Embodiment 1, 2 pairs of SV-GMR elements (pair of R1 and R2, pair of R3 and R4) are linearly arranged in the thickness direction orthogonal to the direction of rotating the soft magnetic gear as the magnetic moving body, as in Embodiment 3 of FIG. 10, the paired SV-GMR elements R1 and R2 may be overlapped to arrange in the direction of the gap between the soft magnetic gear and the bias magnet 5 and the paired SV-GMR elements R3 and R4 may similarly be overlapped to arrange in the direction of the gap between the soft magnetic property gear and the bias magnet 5. Further, the-laminated body of the SV-GMR elements R1, R2 and the laminated body of the SV-GMR elements R3, R4 are linearly arranged in the thickness direction orthogonal to the direction of rotating the soft magnetic gear. The other constitution is similar to that of Embodiment 1.

In the case of Embodiment 3, the paired SV-GMR elements are overlapped to arrange and therefore, the length of linearly arranging the SV-GMR elements in the thickness direction of the soft magnetic gear can be shortened and the thickness of the gear can be reduced.

Further, although in Embodiment 3 of FIG. 10, in 4 pieces of SV-GMR elements R1 through R4, the paired SV-GMR elements are constituted to overlap, a total of 4 pieces of SV-GMR elements may be overlapped to arrange in the direction of the gap between the soft magnetic gear and the bias magnet. In this case, 4 pieces of SV-GMR elements are arranged in the direction orthogonal to the direction of rotating the gear.

Further, although in Embodiments 1, 2, 3, the case of periodically arranging the projected portions of the rotating soft magnetic gear is shown, a magnetic moving body provided with a single piece or a plurality of pieces of projected portions or recessed portion at an outer peripheral face of a rotating soft magnetic circular disk can be used.

Further, the magnetic moving body may be constructed by a constitution of providing a single piece or a plurality of pieces of projected portions or recessed portions at a linearly moving body of a soft magnetic property material and a constitution of detecting linear movement of the linearly moving body by at least a single pair of SV-GMR elements aligned in a direction substantially orthogonal to the direction of moving the magnetic moving body may be constructed.

Further, the Wheatstone bridge may be constituted by using the pair of SV-GMR elements R1, R2 and using fixed resistors in place of other pair of SV-GMR elements R3, R4. In this case, a detected output of twice as much as that in the case of using a single piece of SV-GMR element can be provided.

Although as described above, an explanation has been given of embodiments of the invention, it is apparent for the skilled person that the invention is not limited thereto but can variously be changed for modified within the range described in claims.

Embodiment 4 of a moving body detecting apparatus according to the invention will be explained in reference to FIG. 12 through FIG. 15. Embodiment 4 shows a case of constituting a rotation sensor for detecting rotation of a soft magnetic gear as a magnetic moving body, and FIG. 12 is an arrangement diagram of the soft magnetic gear 1 as the magnetic moving body, an SV-GMR element 10 and the bias magnet 5 for applying the bias magnetic field thereto.

According the embodiment, the SV-GMR element is used as a GMR element a resistance value of which is changed in correspondence with the magnetic field changed by the soft magnetic gear 1 constituting the magnetic moving body, and the schematic film constitution and the magnetic property are shown in FIG. 7. A detailed explanation thereof is the same as that of first embodiment and therefore, the explanation will be omitted.

Figure 12:
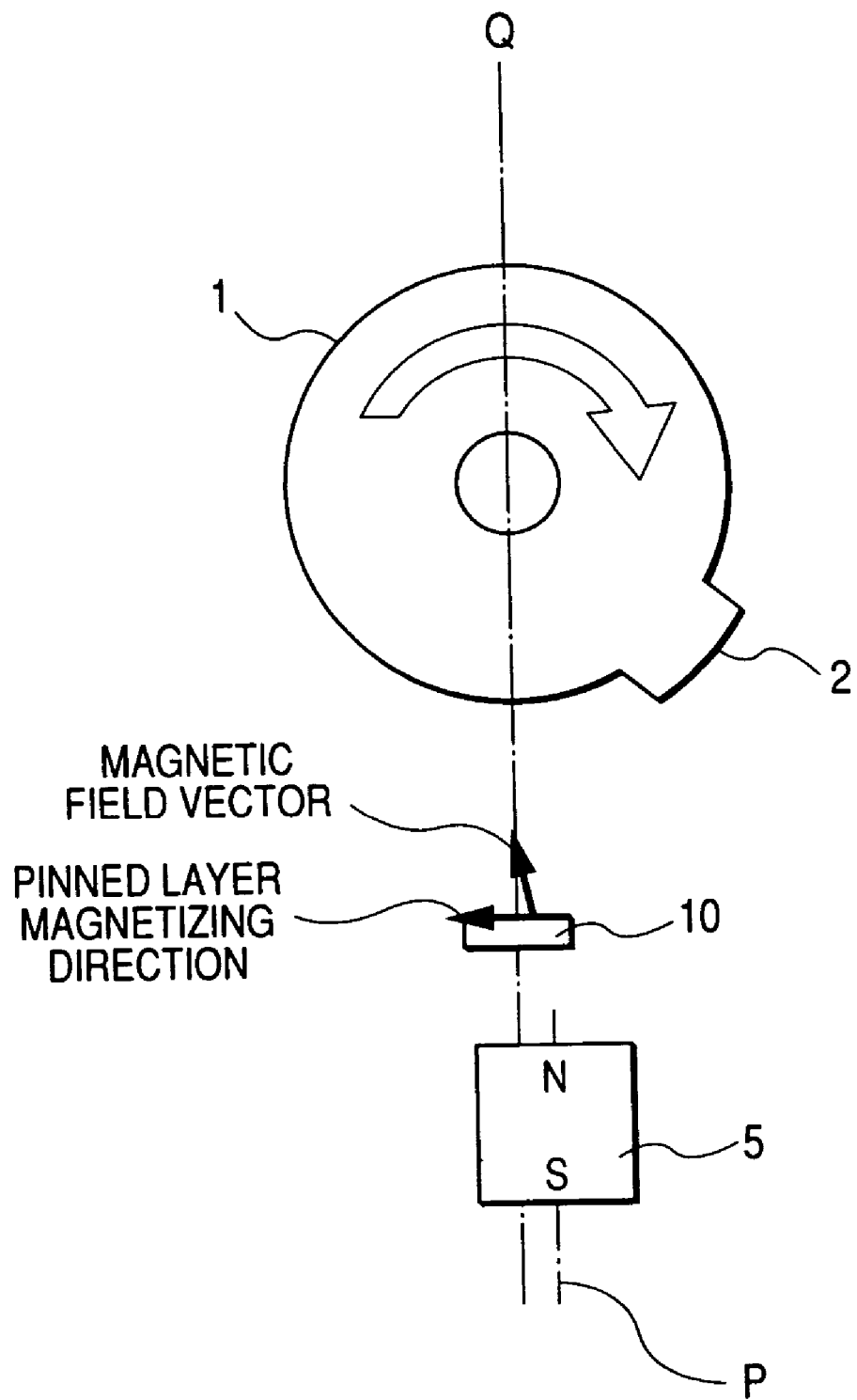
FIG. 12 is a schematic arrangement view of Embodiment 4 of a moving body detecting apparatus according to the invention, showing a constitution of the moving body detecting apparatus.

The SV-GMR element 10 having the magnetic property as shown by FIG. 7 is arranged between the soft magnetic gear 1 as the magnetic moving body and the bias magnet 5 as shown by FIG. 12, and a magneto sensitive face of the SV-GMR element 10 is opposed to the outer peripheral face of the gear 1. The bias magnet 5 is the permanent magnet having, for example, the N pole at a face opposed to the outer peripheral face of the soft magnetic gear 1 and the S pole at a face opposed thereto to constitute an arrangement in which the SV-GMR element 10 is disposed between the N pole face and the soft magnetic gear 1 and a center of the SV-GMR element is shifted relative to a center axis P (center axis of the magnetic pole face) of the bias magnet 5 in a direction of moving the projected portion 2 of the gear 1 (left and right direction of FIG. 12). Further, in FIG. 12, a linear line Q passing the center of the SV-GMR element and orthogonal to the magneto sensitive face is set to pass the rotational center of the gear 1.

Figure 13A:
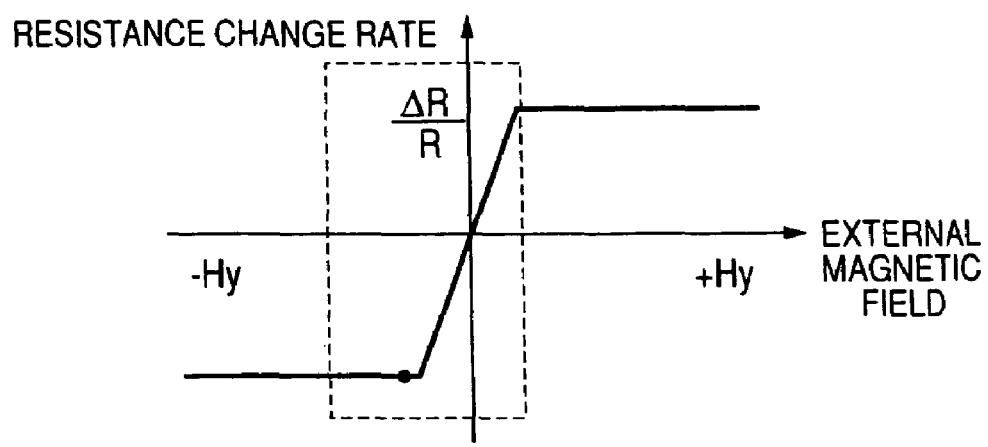
FIG. 13A is an explanatory view showing a bias point of an SV-GMR element by a magnetic field of a bias magnet in Embodiment 4.
Figure 13B:
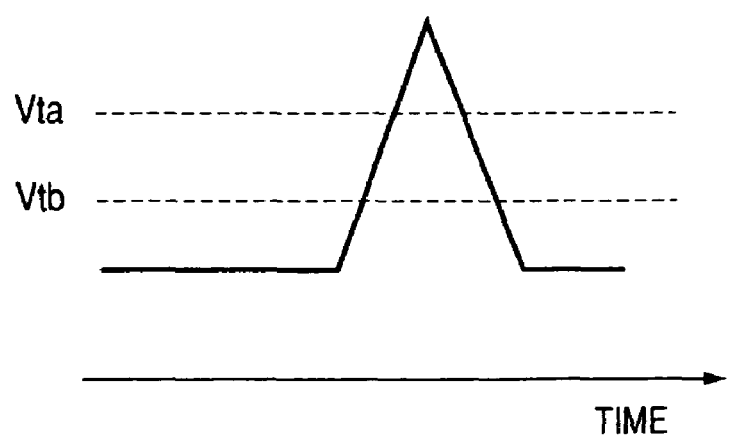
FIG. 13B is a waveform diagram showing a detected waveform by a change in a resistance of the SV-GMR element in Embodiment 4.
Figures 14A, 14B, 14C, 14D:
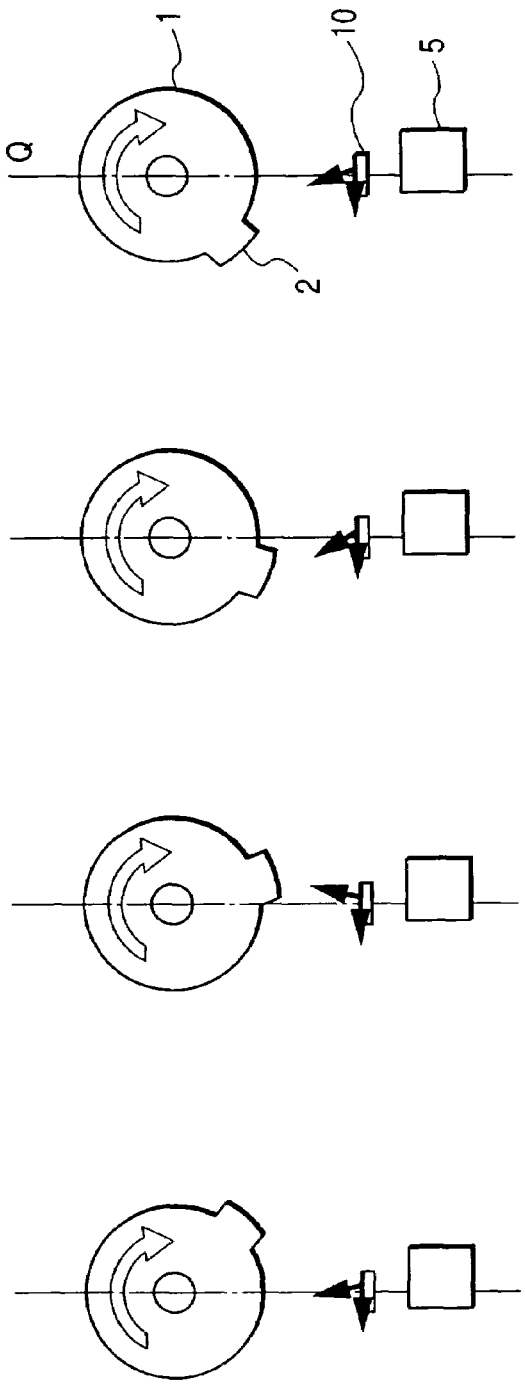
FIGS. 14A through 14D are operation views in a case of Embodiment 4.

The reason that the center of the SV-GMR element is shifted relative to the center axis P of the bias magnet 5 in the direction of moving the projected portion of the gear 1 (left and right direction of FIG. 1) as in FIG. 12 is for setting a bias point of the SV-GMR element 10 in a lower limit saturated region (or upper saturated region) such that as shown by FIGS. 13A, 13B and FIG. 14A, in a first state in which a change in the magnetic field by the projected portion 2 of the soft magnetic gear 1 is not received, the magnetic field at the position of the SV-GMR element is provided with a component forwardly in parallel or in anti-parallel with the magnetizing direction of the pinned layer.

FIGS. 14A through 14D show a track of an operating point of the SV-GMR element in accordance with rotating the soft magnetic gear 1 by a bold line, in FIG. 14A, the projected portion 2 of the soft magnetic gear 1 is disposed at a position considerably separated from the SV-GMR element 10, and is biased to constitute an operating point of the lower limit saturated region by a forward parallel magnetic field component which is in parallel with the magnetizing direction of the pinned layer of the SV-GMR element by the bias magnetic field of the bias magnet 5 and having the same sense (first state in which the SV-GMR element becomes a low resistance).

By making the projected portion 2 approach the right side of the SV-GMR element 10 in accordance with rotation of the soft magnetic gear 1 as shown by FIG. 14B, the magnetic field at the position of the SV-GMR element is influenced thereby to provide a anti-parallel magnetic field component in parallel with the magnetizing direction of the pinned layer and having an opposite direction thereto and the operating point of the SV-GMR element is shifted to the upper limit saturated region (a second state in which the SV-GMR element is provided with a high resistance).

When the projected portion 2 is shifted to the left side of the SV-GMR element 10 by passing a front face thereof in accordance with rotation of the soft magnetic gear 1 as shown by FIG. 14C, the magnetic field at the position of the SV-GMR element is influenced thereby to provide again the forward parallel magnetic field component in parallel with the magnetizing direction of the pinned layer and having the same sense, the operating point of the SV-GMR element is shifted to the lower limit saturated region, to maintain the first state in which the SV-GMR element is provided with the low resistance until the direction of the magnetic field component in parallel with the magnetizing direction of the pinned layer is inversed in FIG. 14B by way of FIG. 14D, FIG. 14A thereafter.

Therefore, a detected waveform of the SV-GMR element is reacted with only one edge of the projected portion 2 of the soft magnetic gear 1, a waveform of a detecting signal as shown by FIG. 13B can be provided by passing the projected portion 2 once and a rectangular wave output can be provided by shaping the waveform by the rise threshold voltage Vta, the fall threshold voltage Vtb.

Figure 15A:
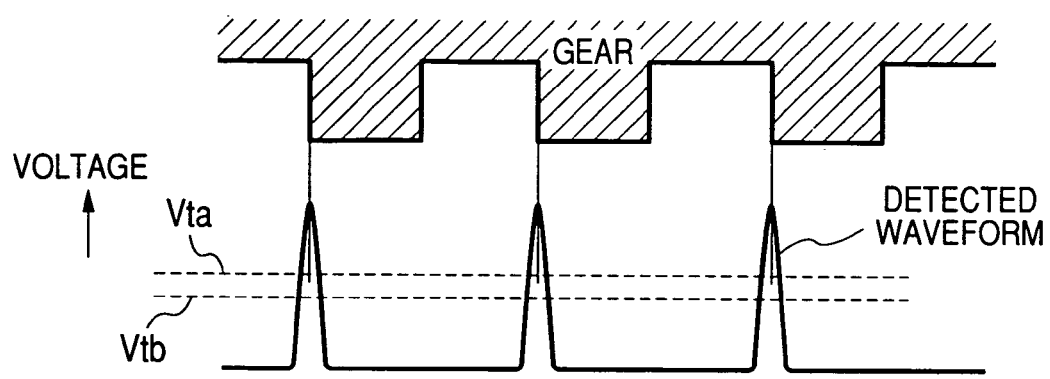
FIG. 15A is a detected waveform diagram by a change in a resistance of an SV-GMR element in correspondence with a projected portion of a soft magnetic gear of Embodiment 4.
Figure 15B:
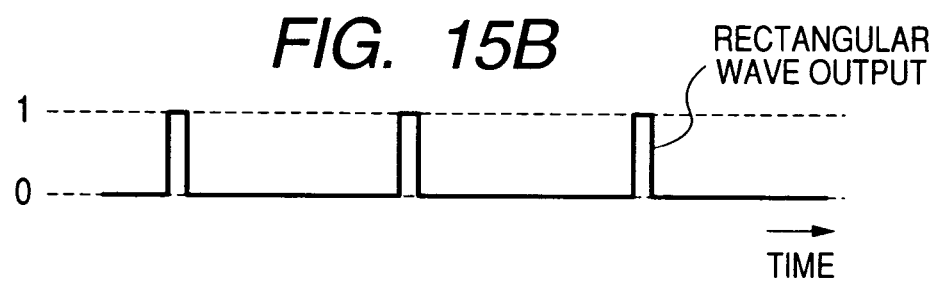
FIG. 15B is a rectangular wave output waveform diagram shaping a detected waveform of Embodiment 4 by a rise threshold voltage Vta, a fall threshold voltage Vtb.
Figure 16:
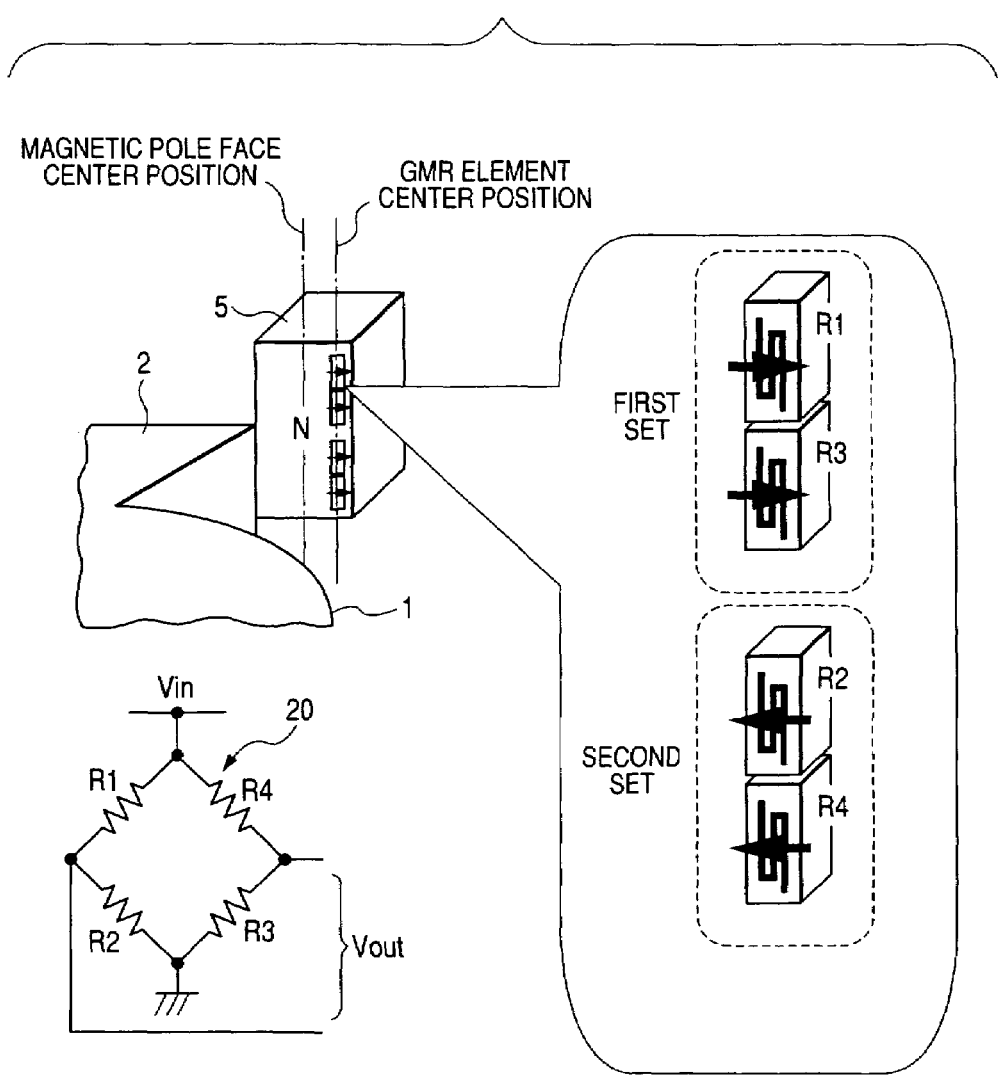
FIG. 16 illustrates a schematic perspective view of Embodiment 5 of a moving body detecting apparatus according to the invention showing a constitution of the moving body detecting apparatus and a Wheatstone bridge circuit diagram.

FIG. 15A shows a detected waveform by a change in the resistance of the SV-GMR element in correspondence with the projected portion of the soft magnetic gear, and FIG. 15B shows a rectangular wave output constituted by shaping the detected waveform by the rise threshold voltage Vta, the fall threshold voltage Vtb. In this case, by operating the SV-GMR element at the lower limit saturated region and the upper limit saturated region, a change in the detected waveform of FIG. 15A caused by a variation in an interval of attaching the projected portion and the SV-GMR element is not brought about and a stable rectangular wave output can be provided. Further, even when the threshold voltage is varied by the temperature drift of a circuit element (waveform shaping circuit or the like) for providing the rectangular wave output, the detected waveform by the change in the resistance of the SV-GMR element is steep both in the rise and the fall as in FIG. 15A and therefore, and the variations in the position of the pulse the pulse width of the rectangular wave output of FIG. 15B becomes extremely small. Further, an influence by disturbance noise is made to be difficult to be effected.

FIG. 16, FIG. 17, FIG. 18A, 18B show Embodiment 5 of a moving body detecting apparatus according to the invention, a Wheatstone bridge circuit 20 is constituted by 4 pieces of SV-GMR elements R1, R2, R3, R4 to construct a constitution of providing a detected output by a change in resistances of the SV-GMR elements R1, R2, R3, R4. In this case, although a relationship among positions of the respective SV-GMR elements and the soft magnetic gear 1 and the bias magnet 5 is similar to that in the case of FIG. 12, in the first state in which a change in the magnetic field by the projected portion 2 of the soft magnetic gear 1 is not substantially received, the direction of magnetizing the pinned layers of the first set of SV-GMR elements R1, R3 and a component of the magnetic field in parallel with the direction of magnetizing the pinned layers by the bias magnet 5 are in the same direction (forward parallel) and the direction of magnetizing the pinned layers of the second of SV-GMR elements R2, R4 and the component of the magnetic field in parallel with the direction of magnetizing the pinned layers by the bias magnet 5 are directions inverse to each other (anti-parallel). Further, although in FIG. 16, the respective SV-GMR elements R1, R2, R3, R4 are arranged on a linear line orthogonal to the rotating face of the soft magnetic gear 1, the respective SV-GMR elements R1, R2, R3, R4 may be overlapped to arrange in a direction in parallel with the rotating face and orthogonal to the rotating direction of the soft magnetic gear 1 (a diameter direction of the soft magnetic gear 1.

The Wheatstone bridge circuit is constituted by the pair of SV-GMR elements R1, R2 and other pair of SV-GMR elements R3, R4 and a constant supply voltage Vin is supplied to the Wheatstone bridge circuit. The detected output Vout is provided as the potential difference between the connecting point of R1, R2 and the connecting point of R3, R4.

Figure 17:
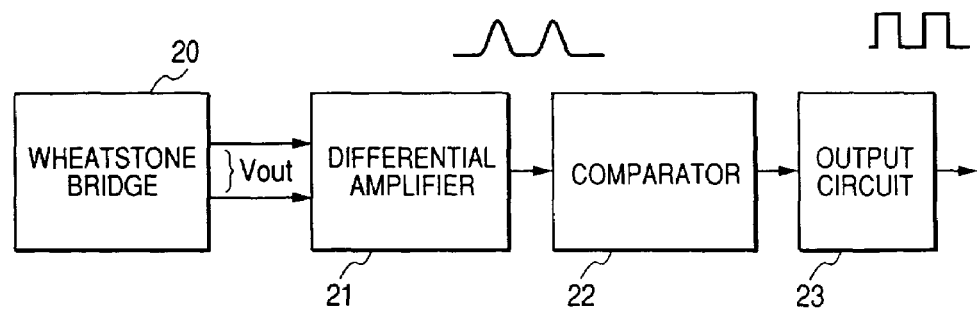
FIG. 17 is a block diagram of a processing circuit for subjecting a detected output of a Wheatstone bridge circuit of an SV-GMR element to an amplifying processing.

FIG. 17 shows a circuit constitution for providing a rectangular wave output from the Wheatstone circuit bridge 20 using the SV-GMR elements R1, R2, R3, R4, a detected output Vout of the Wheatstone bridge circuit 20 is amplified by a differential amplifier 21, thereafter, compared with the rise threshold voltage Vta, the fall threshold voltage Vtb by a comparator 22 to shape a waveform and a rectangular wave output is provided from an output circuit 23.

Figure 18A:
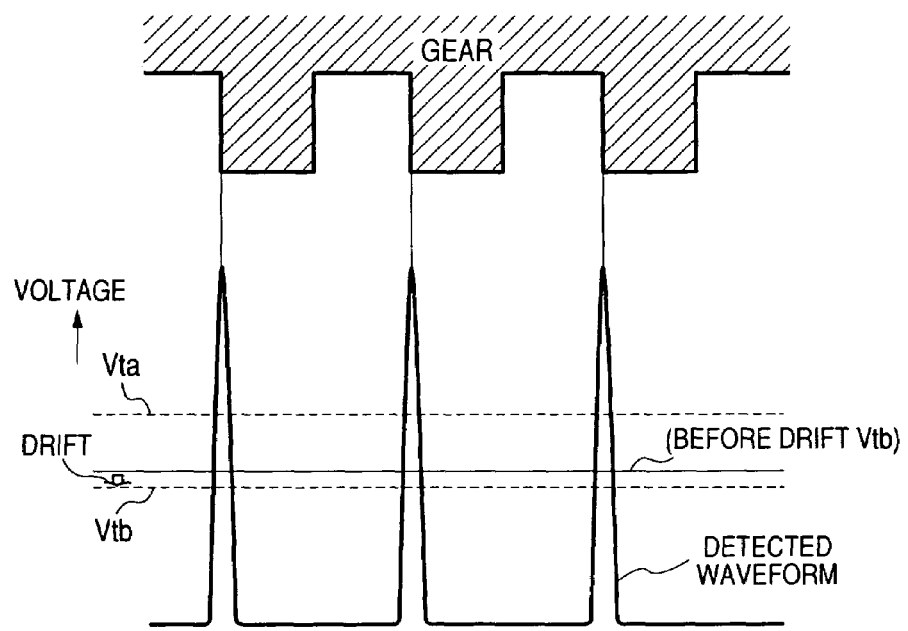
FIG. 18A is a detected waveform diagram of a Wheatstone bridge circuit in correspondence with a projected portion of a soft magnetic gear according to Embodiment 5.
Figure 18B:
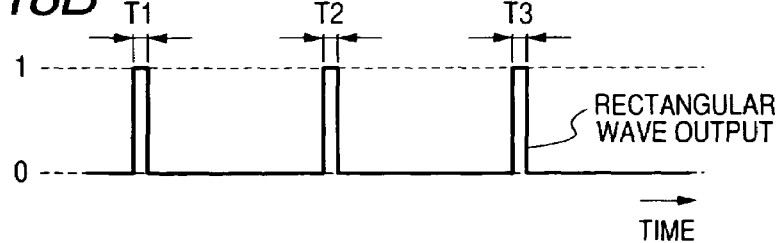
FIG. 18B is a rectangular wave output waveform diagram shaping a detected waveform of Embodiment 5 by a rise threshold voltage Vta, a fall threshold voltage Vtb.

FIG. 18A, FIG. 18B show an example of an output waveform in a temperature drift in the case of Embodiment 5, FIG. 18A shows a detected waveform of the Wheatstone bridge circuit 20 in correspondence with the projected portion of the soft magnetic gear, and FIG. 18B shows a rectangular wave output constituted by shaping the detected waveform by the rise threshold voltage Vta, the fall threshold voltage Vtb. When as shown by FIG. 18A, the fall threshold voltage Vtb which has been disposed at a linear line position before drift is changed to a dotted line position after drift, since the detected waveform is extremely steep both in the rise and the fall, variations in the pulse positions and the pulse widths T1, T2, T3 of the rectangular wave output of FIG. 18B are extremely small (further improved than in the case of using a single piece of SV-GMR element).

An allowance is produced in a range of drift of the threshold voltage and therefore, a detected output waveform which is further difficult to be influenced by temperature drift or the like than that of the intensity detecting type GMR element can be provided. Further, by integrating the Wheatstone bridge circuit 20, a detected output 4 times as much as that in using a single one of SV-GMR element can be provided and a rectangular wave output signal which is difficult to be influenced by axis deflection of the soft magnetic gear as the magnetic moving body and other disturbance noise can be provided.

Figure 19A:
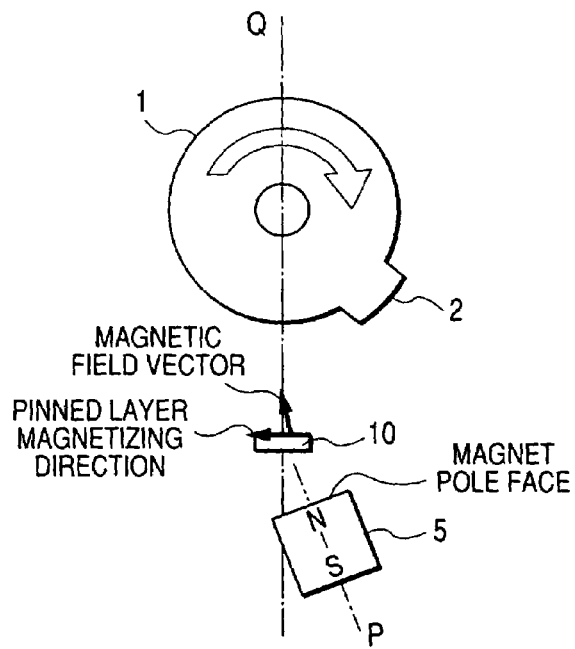
FIGS. 19A through 19D are schematic arrangement views respectively showing other embodiments of a moving body detecting apparatus according to the invention.

FIGS. 19A through 19D respectively show Embodiments 6 through 9 of the moving body detecting apparatus according to the invention. FIG. 19A shows Embodiment 6 in which the SV-GMR element 10 is arranged between the soft magnetic gear 1 as the magnetic moving body and the bias magnet 5 and the magneto sensitive face of the SV-GMR element 10 is opposed to the outer peripheral face of the gear 1. The linear line Q passing the center of the SV-GMR element and orthogonal to the magneto sensitive face passes through the rotational center of the gear 1 and the bias magnet 5 is inclined to arrange at a position shifted in a left and right direction relative to the linear line Q (the magneto sensitive face of the SV-GMR element 10 and the magnetic pole face of the magnet 5 are not in parallel with each other). A direction of inclining the bias magnet 5 is, for example, a direction of passing the center axis P (center axis of the magnetic pole face) through a vicinity of the center of the SV-GMR element. Thereby, in the first state in which a change in the magnetic field by the projected portion 2 of the soft magnetic gear 1 is not substantially received, the magnetic field at the position of the SV-GMR element can be set to include a component forwardly in parallel (or in anti-parallel) with the magnetizing direction of the pinned layer of the SV-GMR element 10 and in the second state of receiving the change in the magnetic field by the projected portion 2, the magnetic field can be set to inverse the direction of the component of the magnetic field in parallel with the magnetizing direction of the pinned layer at the position of the SV-GMR element.

Figure 19B:
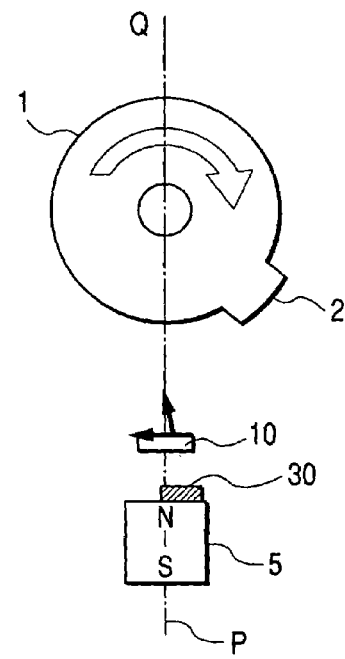

FIG. 19B shows Embodiment 7 in which the SV-GMR element 10 is arranged between the soft magnetic gear 1 as the magnetic moving body and the bias magnet 5 and the magneto sensitive face of the SV-GMR element 10 is opposed to the outer peripheral face of the gear 1. The linear line Q passing the center of the SV-GMR element and orthogonal to the magneto sensitive face passes through the rotational center of the gear 1, and the bias magnet 5 is arranged on the linear line Q (the linear line Q and the center axis P of the magnet 5 may coincide with each other). However, a magnetic yoke 30 is partially arranged at a position of the magnetic pole face of the bias magnet 5 shifted in the direction of moving the soft magnetic gear 1, and in the first state in which a change in the magnetic field by the projected portion 2 of the soft magnetic gear 1 is not substantially received, the magnetic field at the position of the SV-GMR element is set to include a component forwardly in parallel (or in anti-parallel) with the magnetizing direction of the pinned layer of the SV-GMR element 10.

Thereby, in the first state in which the change in the magnetic field by the projected portion 2 of the soft magnetic gear 1 is not substantially received, the magnetic field at the position of the SV-GMR element can be set to include a component forwardly in parallel (or in anti-parallel) with the magnetizing direction of the pinned layer of the SV-GMR element 10 and in the second state of receiving the change in the magnetic field by the projected portion 2, the magnetic field can be set to inverse the direction of component of the magnetic field at the position of the SV-GMR element in parallel with the magnetizing direction of the pinned layer.

Figure 19C:
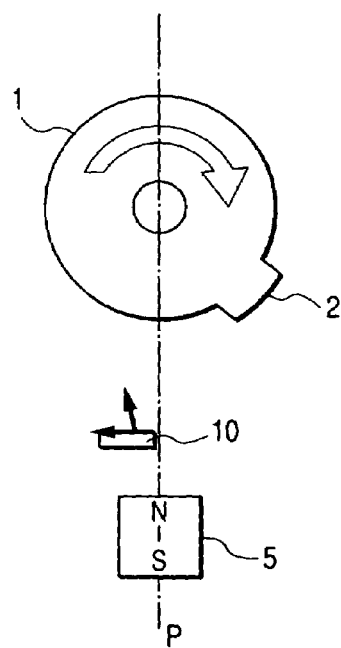

FIG. 19C shows Embodiment 8 in which the SV-GMR element 10 is arranged between the soft magnetic gear 1 as the magnetic moving body and the bias magnet 5 and the magneto sensitive face of the SV-GMR element 10 is opposed to the outer peripheral face of the gear 1. Further, the bias magnet 5 is arranged such that the center axis P (center axis of the magnetic pole face) passes the rotational center of the gear 1 and is arranged such that the center of the SV-GMR element 10 is shifted in the left and right direction of the center axis P, that is, the direction of moving the gear 1.

Thereby, in the first state in which the change in the magnetic field by the projected portion 2 of the soft magnetic gear 1 is not substantially received, the magnetic field at the position of the SV-GMR element can be set to include the component forwardly in parallel (or in anti-parallel) with the magnetizing direction of the pinned layer of the SV-GMR element 10 and in the second state of receiving the change in the magnetic field by the projected portion 2, the magnetic field can be set to inverse the direction of the component of the magnetic field at the position of the SV-GMR element in parallel with the magnetizing direction of the pinned layer of the magnetic field.

Figure 19D:
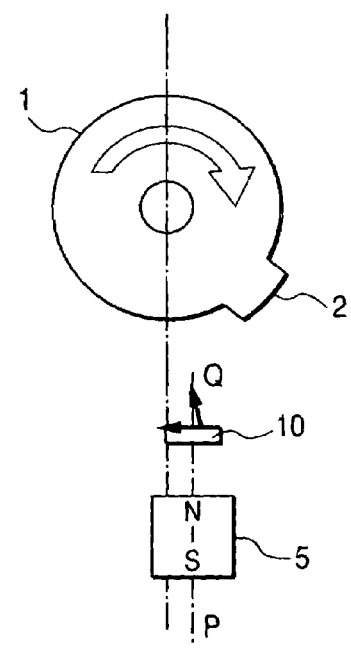

FIG. 19D shows Embodiment 9 in which the SV-GMR element 10 is arranged between the soft magnetic gear 1 as the magnetic moving body and the bias magnet 5 and the magetosensitive face of the SV-GMR element 10 is opposed to the outer peripheral face of the gear 1. Further, the center of the SV-GMR element 10 is disposed on the center axis P of the bias magnet 5 (center axis of the magnetic pole face) (the center axis P of the magnet 5 and the linear line Q passing the center of the SV-GMR element may coincide with each other). However, the rotational center of the soft magnetic gear 1 as the rotating member is disposed at a position shifted from the linear line of passing the bias magnet 5 and the center of the SV-GMR element in the moving direction.

Thereby, in the first state in which the change in the magnetic field by the projected portion 2 of the soft magnetic gear 1 is not substantially received, the magnetic field at the position of the SV-GMR element can be set to include the component forwardly in parallel (or in anti-parallel) with the magnetizing direction of the pinned layer of the SV-GMR element 10 and in the second state of receiving the change in the magnetic field by the projected portion 2, the magnetic field can be set to inverse the direction of the component of the magnetic field at the position of the SV-GMR element in parallel with the magnetizing direction of the pinned layer of the magnetic field.

Also by constitutions of Embodiments 6 through 9, a change in the resistance of the SV-GMR element can be detected similar to the case of Embodiment 4 by shifting from the first state (operating point: lower limit saturated region) to the second state (operating point: upper limit saturated region) in accordance with rotation of the soft magnetic gear 1 and returning from the second state to the first state. An effect achieved thereby is also similar to that of Embodiment 4. Further, in Embodiment 6 through 9, as in Embodiment 5, a detected output may be provided by constituting the Wheatstone bridge circuit by using 4 pieces of the SV-GMR elements.

Although according to Embodiments 4 through 9, the case of a single piece of the rotating soft magnetic gear is shown as the magnetic moving body, a magnetic moving body periodically provided with projected portions or recessed portions at the outer peripheral face of the soft magnetic gear can be used. Further, the magnetic moving body may be constructed by a constitution of providing a single piece or a plurality of pieces of projected portions or recessed portions at a linear moving body of the soft magnetic property material.

Further, the Wheatstone bridge circuit may be constituted by using the pair of SV-GMR elements R1, R2 (pinned layer magnetizing directions are opposite to each other) and using fixed resistors in place of other SV-GMR elements R3, R4, or the Wheatstone bridge circuit may be constituted by using SV-GMR elements R1, R3 (pinned layer magnetizing directions are in the same direction) and using fixed resistors in place of other SV-GMR elements R2, R4. In these cases, a detected output twice as much as that in the case of using a single piece of SV-GMR element can be provided.

Although as described above, an explanation has been given of the embodiments of the invention, it is apparent for the skilled person that the invention is not limited thereto but can be changed or modified within the range described in claims.

What is claimed is:

1. A moving body detecting apparatus comprising:
   a magnetic moving body having at least a projected portion or a recessed portion;
   magnetic field generating means for generating a magnetic field; and
   at least a pair of spin valve type giant magneto resistive elements between the magnetic moving body and the magnetic field generating means,
   wherein the at least a pair of spin valve type giant magneto resistive elements are arranged to align in a direction substantially orthogonal to a moving direction of the magnetic moving body and to align linearly in a thickness direction of the magnetic moving body, and
   wherein said moving body detecting apparatus is arranged such that magnetizing directions of pinned layers of the paired spin valve type giant magneto resistive elements are directed substantially in a forward direction and substantially in an opposite direction, respectively, relative to the moving direction of the magnetic moving body.

2. The moving body detecting apparatus according to claim 1, wherein the paired spin valve type giant magneto resistive elements include double meander patterns as a magnetoresistance pattern.

3. The moving body detecting apparatus according to claim 1, wherein the paired spin valve type giant magneto resistive elements are overlapped to align between the magnetic moving body and the magnetic field generating means.

4. A moving body detecting apparatus comprising:
   a magnetic moving body having at least one projected portion or recessed portion;
   magnetic field generating means for generating a magnetic field; and
   a spin valve type giant magneto resistive element between the magnetic moving body and the magnetic field generating means,
   wherein in a first state in which a change in the magnetic field by the projected portion or the recessed portion of the magnetic moving body is not substantially received, the magnetic field at a position of the spin valve type giant magneto resistive element includes a component in parallel or in anti-parallel with a magnetizing direction of a pinned layer of the spin valve type giant magneto resistive element,
   wherein in a second state of receiving a change in the magnetic field by the projected portion or the recessed portion, a direction of a component of the magnetic field at the position of the spin valve type giant magneto resistive element is inversed,
   wherein at least a pair of the spin valve type giant magneto resistive elements are provided and magnetizing directions of pinned layers of the paired spin valve type giant magneto resistive elements are directed opposite to each other.

5. The moving body detecting apparatus according to claim 4, wherein a center of the spin valve type giant magneto resistive element is shifted in a moving direction of the magnetic moving body relative to a center of the magnetic field generating means.

6. The moving body detecting apparatus according to claim 4, wherein a magnetic pole face is inclined such that a magneto sensitive face of the spin valve type giant magneto resistive element and the magnetic pole face of the magnetic field generating means are not in parallel with each other.

7. The moving body detecting apparatus according to claim 4, wherein a yoke is partially arranged at a position shifted from a center of a magnetic pole face of the magnet field generating means in a moving direction of the magnetic moving body.

8. The moving body detecting apparatus according to claim 4, wherein the magnetic moving body is a rotating member including the projected portion or the recessed portion, the spin valve type giant magneto resistive element is arranged between an outer periphery of the rotating member and the magnetic field generating means, and a rotational center of the rotating member is disposed at a position shifted from a linear line passing a center of the magnetic field generating means and a center of the spin valve type giant magneto resistive element.

9. The moving body detecting apparatus according to claim 4, wherein the at least a pair of spin valve type giant magneto resistive elements are arranged to align in a direction substantially orthogonal to a moving direction of the magnetic moving body and to align linearly in a thickness direction of the magnetic moving body.

* * * * *